No. 615,533. Patented Dec. 6, 1898.
A. R. DEMORY.
BICYCLE STEP.
(Application filed June 17, 1898.)

(No Model.)

Witnesses:
Geo. W. Young.
N. E. Oliphant

Inventor:
Adam R. Demory.
By H. G. Underwood
Attorney

UNITED STATES PATENT OFFICE.

ADAM R. DEMORY, OF MILWAUKEE, WISCONSIN, ASSIGNOR, BY MESNE ASSIGNMENTS, TO MORITZ FICHTENBERG, OF SAME PLACE.

BICYCLE-STEP.

SPECIFICATION forming part of Letters Patent No. 615,533, dated December 6, 1898.

Application filed June 17, 1898. Serial No. 683,670. (No model.)

*To all whom it may concern:*

Be it known that I, ADAM R. DEMORY, a citizen of the United States, and a resident of Milwaukee, in the county of Milwaukee and State of Wisconsin, have invented certain new and useful Improvements in Bicycle-Steps; and I do hereby declare that the following is a full, clear, and exact description thereof.

My invention has for its object to provide a simple economical bicycle-step that also serves as a washer and casing for an axle-nut.

Therefore said invention consists in the structural peculiarities of the bicycle-step hereinafter particularly set forth with reference to the accompanying drawings and subsequently claimed.

Figure 2:
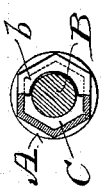
Figure 4:
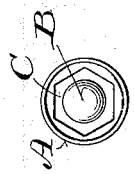
Figure 1:
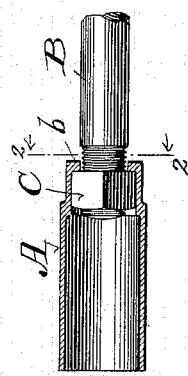
Figure 3:

Figure 1 of the drawings represents my improved bicycle-step in longitudinal section on the plane indicated by line 1 1 in the third figure of the series and it also illustrates the step in position for use as a washer for an axle-nut incased thereby; Fig. 2, an inner end view of said step, partly broken away, that portion of an axle shown in the preceding figure being in transverse section, as indicated by line 2 2 in said preceding figure; Fig. 3, an elevation of the step as it appears in practice; and Fig. 4, an outer end view of said step, nut, and axle.

Referring by letter to the drawings, A represents my improved bicycle-step, B a portion of a wheel-axle, and C a nut run on the axle within the step.

The step is tubular and has inturned flange *b* at its inner end, constituting a washer for the nut C, the interior of said step adjacent to this flange being shown as shaped to have the same angular contour and dimensions as said nut. It is further shown that the exterior of the step adjacent to its flanged end may be made polygonal in order to facilitate the use of a wrench; but it is just as practical to have said step of exterior circular contour throughout its length and make provision for the use of a spanner, it being understood that rotation of the aforesaid step is necessary in order to run the nut C on or off the axle.

As my invention consists in a tubular nut-fitting bicycle-step provided at one end with an inturned flange constituting a washer there may be more or less of mechanical variation from the showing herein made without departure from said invention.

Having thus described my invention, what I claim as new, and desire to secure by Letters Patent, is—

1. A tubular bicycle-step provided at one end with an integral washer in the form of an inturned flange and exteriorly shaped adjacent to the flange to fit an independent nut.

2. A tubular nut-fitting bicycle-step provided with an integral washer in the form of an inturned end flange and having exterior polygonal contour adjacent to the flange.

In testimony that I claim the foregoing I have hereunto set my hand, at Milwaukee, in the county of Milwaukee and State of Wisconsin, in the presence of two witnesses.

ADAM R. DEMORY.

Witnesses:
   N. E. OLIPHANT,
   B. C. ROLOFF.